Patented Oct. 1, 1946

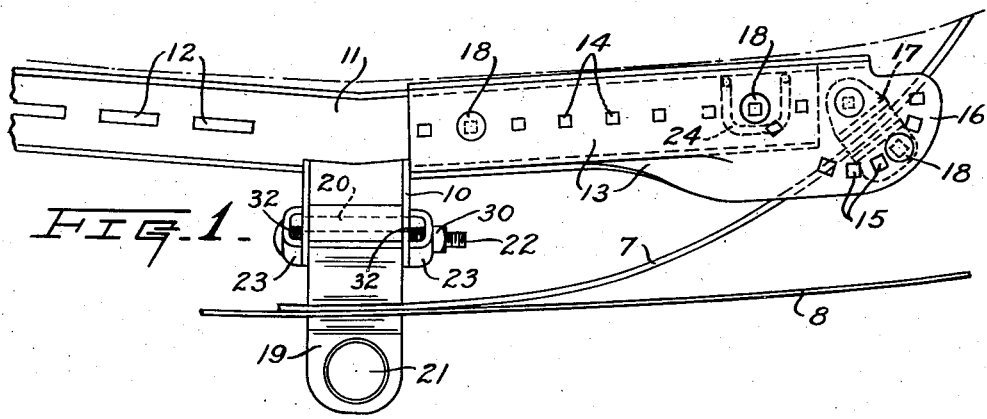
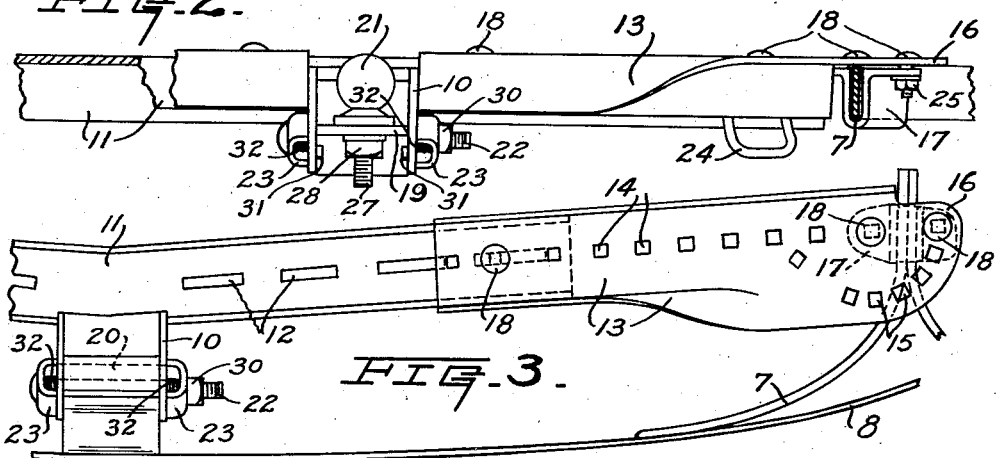
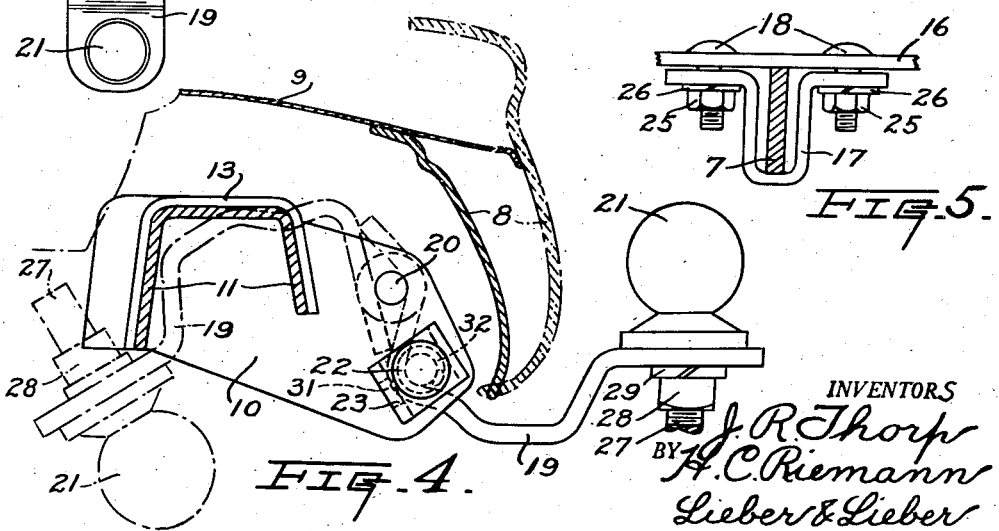

2,408,531

UNITED STATES PATENT OFFICE 2,408,531

TRAILER HITCH

Howard C. Riemann, West Milwaukee, and Joel R. Thorp, West Allis, Wis., assignors to The Fulton Company, West Allis, Wis., a corporation of Wisconsin Application December 18, 1944, Serial No. 568,576

13 Claims. (Cl. 280—33.44)

Our present invention relates generally to improvements in devices for facilitating attachment of one vehicle to another, and relates more specifically to improvements in the construction and operation of trailer hitches for motor driven vehicles such as automobiles, tractors or the like.

The primary object of this invention is to provide an improved trailer hitch which is simple in construction, flexible in its adaptations, and efficient in use.

While numerous types of so-called trailer couplings for connecting trailers to draft vehicles such as tractors and automobiles, have heretofore been used extensively, considerable difficulty has been encountered in attempting to apply these couplings to modern streamlined vehicles wherein suitable points of attachment are normally concealed by the bodies, fenders and bumpers and are therefore relatively inaccessible. Perhaps the most successful and extensively used trailer coupling, comprises in general a socketed member adapted to be attached to the draft bar of the trailer, and a ball member normally coacting with the socket of the trailing member and formed for attachment to some durable and sturdy portion such as the frame of the draft vehicle. However, in the latest streamlined automobile models, it is impossible to conveniently attach accessories such as coupling draft members directly to the frame and bumper because of the concealment of the rear frame portions and obstructions produced by relatively thin coverings such as sheet metal bodies, fenders, and splash plates. These sheet metal parts are insufficiently strong to withstand the pull induced by a trailing vehicle, and in many cases even the bumpers are not sufficiently strong. In most cases, the bumpers are also made inaccessible by splash pans, license plate frames, and the like, and the bolts which attach the bumpers to the bumper brackets often become loose or have their threads stripped, thus permitting the bumpers to drop off. The extreme diversity in design of bumpers also makes standardization of bumper coupling clamps practically impossible, and it has heretofore been difficult to readily detachably and firmly attach such coupling members to streamlined vehicles. Then too, in cases where the trailer coupling is rarely used, it is undesirable to have the coupling draft member which is attached to such a streamlined vehicle, clearly visible and protruding when not in actual use, because such visibility of the coupling element besides marring the appearance of the car, also provides a dangerous and obstructive outwardly projecting part adapted to cause injury or damage.

It is therefore a more specific object of our invention to provide an improved trailer hitch for streamlined vehicles such as standard automobiles of various models, which may be conveniently applied to diverse types of vehicles in an effective manner, and all portions of which may be readily concealed when not in actual use.

Another specific object of the invention is to provide an improved durable and strong accessory for connecting one of the elements of a trailer coupling to a suitable portion of a draft vehicle, and which is quickly adjustable to fit vehicles of different styles or types.

A further specific object of this invention is to provide an improved draft assemblage which is attachable to the normally concealed frames of streamlined automobiles or the like, and which may be readily adjusted or placed into an invisible position and concealed and protected by the bumper of the car to which it is applied.

Still another specific object of our invention is to provide an improved trailer coupling hitch which may be manufactured and sold at moderate cost, which may be readily applied to or removed from a vehicle by a novice, and which avoids interfering with the normal use of the vehicle bumper bar when the hitch is inactive.

These and other specific objects and advantages of the invention will be apparent from the following detailed description.

A clear conception of the several features constituting the present improvement, and of the construction and operation of trailer hitches embodying the invention, may be had by referring to the drawing accompanying and forming a part of this specification wherein like reference characters designate the same or similar parts in the various views.

Fig. 1 is a fragmentary plan view of one of our improved trailer hitches, showing the same applied to the bumper bracket of one type of vehicle having minimum distance between anchoring points, and also showing the coupling ball member thereof in active position disposed outwardly beyond the rear bumper bar;

Fig. 2 is a similarly fragmentary rear view of the assemblage of Fig. 1, showing the bumper removed and the bumper bracket in section;

Fig. 3 is another fragmentary plan view of the same hitch assembly, showing the same attached to the bumper bracket of another type of vehicle bumper assemblage having maximum distance between anchoring points, and likewise showing the coupling member in active position;

Fig. 4 is an enlarged transverse section through the new trailer hitch, taken near its mid portion and showing the ball coupling member in active position in solid lines and in inactive position in dot-and-dash lines, and also illustrating several typical bar bumper sections; and Fig. 5 is a similarly enlarged fragmentary view of one of the adjustable clamps for rigidly attaching the hitch to a bumper bracket which is shown in section.

While our invention has been shown herein as being especially adapted for use on streamlined automobiles of various models and makes and in conjunction with ball and socket type trailer couplings such as disclosed in our co-pending application Serial No. 564,036, filed November 18, 1944, now Patent No. 2,392,063, Jan. 1, 1946, it is not our desire or intent to unnecessarily restrict the scope or utility of the improved features by virtue of this limited disclosure.

Referring to the drawing, the improved trailer hitch assembly shown therein is especially adapted to be conveniently attached to the rear bumper brackets 7 of an automobile or the like on opposite sides of the central longitudinal plane of the vehicle as near to the vehicle frame as possible, and forwardly of the rear bumper bar 8 and beneath the rear splash plate 9. The bumper brackets 7 and bumper bars 8 may assume various shapes and sizes depending upon the model or type of car, and the vehicle frame and the brackets 7 are normally concealed from view at the top and sides by the splash plates 9, the fenders and the bodies of the automobiles.

Our improved hitch assemblage comprises in general a central U-shaped bracket 10 having a rigid channel shaped bar 11 secured to its front portion, said bar being provided with a series of alined slots 12 on each side of the central plane of the bracket; an elongated channel shaped member 13 slidably adjustable along each slotted side portion of the rigid cross-bar 11, each member 13 having a rectilinear series of polygonal openings 14 therein which are alineable with the slots 12 of the bar 11, and also having an arcuate series of similar openings 15 at the outer widened and flat extremity 16 thereof; a U-shaped clamp 17 disposed beneath the flattened outer extremity of each adjusting member 13; carriage bolts 18 cooperable with the slots 12, openings 14, 15 and with openings in the flanges of the clamps 17 to hold the parts in assembled condition; a draw bar or plate 19 swingably suspended from the opposite resilient side walls of the central bracket 10 by means of a pivot pin 20 and having its swinging end formed for detachable application of a coupling ball member 21; and a clamping bolt 22 and clamps 23 coacting with the main bracket 10 and with the draft plate 19 to firmly retain the latter either in active or inactive position.

The bracket 10 and the cross-bar 11 may be formed of sheet metal with the aid of punches and dies, and may be firmly united by welding or otherwise, or they may be produced from a single piece of metal. The channel shape of the bar 11 provides extremely rigid attaching arms projecting laterally away from the bracket 10, and these arms may be provided with lower loops 24 which serve as points of attachment for safety cables or chains required by law in some States, and which may also be used as manipulating handles. The channel shaped adjusting members 13 which are slidably adjustable along the bar 11, may also be formed of sheet metal with the aid of punches and dies, and the same is true of the clamps 17, 23 and of the draft plate 19, thereby facilitating quantity production of the entire accessory. Standard carriage bolts 18 may be used to adjustably but firmly attach the members 13 to the bar 11 and the clamps 17 to the members 13; and by disposing the slots 12 and the openings 14 in rectilinear alined series, any of the openings 14 may be brought into open alinement with selected slots 12 of the adjacent series, thereby providing great ranges of outward straight line adjustment for the members 13 relative to the central bracket 10. By disposing the openings 15 in the flat end portions 16 of the members 13 in arcuate series disposed in arcs having as centers the extreme end openings 18 of the adjacent rectilinear series, any desired degree of swinging adjustment is readily obtainable for the clamping brackets 17, so that these brackets may thus be caused to coact with bumper braces 7 of various shapes and spaced apart various distances, as near to the main frame of the vehicle as possible.

The carriage bolts 18 may obviously be readily applied to any of the slots 12 and openings 14, 15 and are provided with ordinary clamping nuts 25 and lock washers 26 as shown in Fig. 5; and the square or otherwise polygonal portions of such bolts located near the heads thereof, will prevent turning of the bolts 18 within the similarly polygonal openings 14, 15 of the members 13, thus permitting manipulation of the nuts 25 from beneath. The swingably adjustable draft bar or plate 19 is preferably bent as shown in Fig. 4, in order to clear the lower edge of the rear bumper bar 8 when the hitch is in use, and the pivoted end of the plate 19 is looped around the pivot pin 20 and may be welded so as to prevent spreading of the loop. The coupling ball member 21 may also be formed of sheet metal as disclosed in our prior application hereinbefore referred to, and is provided with an attaching bolt 27 and with a nut 28 and lock washer 29 coacting with the bolt 27 to firmly secure the member 21 to the swinging end of the bar 19. The clamps 23 and the bolt 22 which coact with the opposite resilient side flanges or walls of the central bracket 10, are adapted to clamp these walls against the opposite sides of the end loop of the plate 19 so as to firmly hold the latter in either active and accessible position as shown in solid lines in Fig. 5, or in inactive and concealed position as illustrated in dot-and-dash lines. In order to assist in thus holding the draw bar 19 in position, the clamps 23 are provided with lugs 31 which penetrate the side walls of the bracket 10, and the bolt 22 is embraced by coil springs 32 which pull the lugs 31 out of the path of swing of the bar plate 19 when the nut 30 is released. The bolt 22 may be provided with an ordinary nut 30 for clamping purposes, but need not be provided with a lock washer since the resiliency of the side walls of the bracket 10 and of the sheet metal clamps 23 and springs 32 make the use of such washers unnecessary.

During normal use of the improved trailer coupling hitch, the adjustable channel shaped members 13 may be slid along the laterally projecting arms of the cross-bar 11 to any desired position so that the U-shaped clamps 17 which are initially loosely suspended from the outer portion 16 of the members 13, may be caused to properly cooperate with the bumper supporting brackets 7 of the particular vehicle to which the accessory is to be applied, as near to the frame of the vehicle as possible. The members 13 may then be firmly attached to the cross-bar 11 in the desired positions of adjustment with the aid of bolts 18, either as shown in Fig. 1, or as shown in Fig. 3. The U-shaped clamps 17 may then be swingably adjusted about the end openings 18 of the adjacent rectilinear series, and caused to properly cooperate with the adjacent portions of the bumper supporting brackets 7, whereupon bolts 18 may be applied to the pivot openings 14 and to the nearest opening 15 of the adjacent arcuate series, so as to firmly clamp the members 13 to the brackets 7 as illustrated in Fig. 5. The assemblage will then be firmly attached to the vehicle, and the draft plate 19 may thereafter be swung either into active or into inactive position at the will of the operator, and locked in either of these positions with the aid of the clamping bolt 22, in an obvious manner. It will thus be noted that the improved attachment may be readily applied to vehicles of diverse models and styles, and that the coupling ball member 21 which is carried by the outer swinging end of the draft bar or plate 19 may be conveniently disposed either in accessible or in concealed position. The auxiliary loops 24 which are rigidly attached to the cross-bar 11 may be used when necessary, for purposes of attaching safety cables or chains, thus making the appliance extremely flexible in use and in its adaptations.

From the foregoing detailed description it will be apparent that our present invention provides an improved trailer hitch which besides being extremely simple and compact in construction, is highly flexible in its adaptations, and is also highly efficient in normal use. Since all of the major parts of the assemblage may be readily formed from sheet metal with the aid of presses, punches and dies, the manufacturing cost of the assemblage is reduced to a minimum, while a sturdy and durable assemblage results. The use of standard bolts besides reducing the initial cost also makes replacement of lost bolts readily possible, and it has been found that the improved accessory can be readily applied to various types of automobiles without marring these structures or diminishing the aesthetic appearance thereof. The improved trailer hitch has proven highly successful in actual use and the provision of the rectilinear and arcuate series of adjusting openings 14, 15 has been found extremely useful in facilitating attachment of the accessory to different types of vehicles.

It should be understood that it is not desired to limit this invention to the exact details of construction, or to the precise mode of use, herein shown and described, for various modifications within the scope of the appended claims may occur to persons skilled in the art.

We claim:

1. In a trailer hitch, a bracket having fixed laterally spaced side walls and rigid arms extending outwardly away from said walls, a coupling member swingably suspended from said bracket between said walls, supporting members for said bracket secured to said arms and being independently slidably adjustable therealong, and a clamp swingably adjustable about a vertical pivot relative to the outer end portion of each of said supporting members.

2. In a trailer hitch, a bracket having laterally extending integral arms each provided with a rectilinear series of elongated openings, a coupling member secured to said bracket between said arms, an elongated supporting member slidably cooperable with each of said arms and each being formed for independent adjustable attachment to the adjacent arm along said openings, and a clamp pivotally adjustable about a vertical pivot relative to the outer end of each of said supporting members.

3. In a trailer hitch, a bracket having rigid arms extending from the opposite sides thereof, a coupling member secured to said bracket between said arms, a supporting member slidably adjustable along each of said arms, and a clamp swingably adjustable upon the outer end of each of said supporting members, each of said supporting members having therein a rectilinear set of bolt holes and an arcuate series of similar holes for effecting locking of said member to the adjacent arm and locking of said clamps to the adjacent supporting members.

4. In a trailer hitch, a bracket having opposite side walls and channel shaped arms extending outwardly therefrom, a channel shaped supporting member slidably adjustable along each of said arms, a U-shaped clamp suspended from the outer end of each of said supporting members, a draw bar swingably suspended from said bracket between said side walls, and a coupling member secured to the swinging end of said draw bar.

5. In a trailer hitch, a bracket having opposite side walls and channel shaped arms extending outwardly therefrom, a channel shaped supporting member slidably adjustable along each of said arms, a U-shaped clamp suspended from the outer end of each of said supporting members, a draw bar swingably suspended from said bracket between said side walls, a coupling member secured to the swinging end of said draw bar, and means coacting with said walls to clamp said draw bar so as to retain said coupling member in either active or inactive position.

6. In a trailer hitch, a bracket having spaced side walls and channel shaped rigid arms extending laterally therefrom, a channel shaped elongated supporting member slidably adjustable in a straight line along each of said arms, a U-shaped bumper bracket clamp swingably adjustably suspended beneath the outer end of each of said supporting members, means for locking said members to said arms and said clamps to said members in various positions of relative adjustment, and a draw bar swingably suspended from said bracket between said walls.

7. In a trailer hitch, a bracket having spaced side walls and channel shaped rigid arms extending laterally therefrom, a channel shaped elongated supporting member slidably adjustable in a straight line along each of said arms, a U-shaped bumper bracket clamp swingably adjustably suspended beneath the outer end of each of said supporting members, means for locking said members to said arms and said clamps to said members in various positions of relative adjustment, a draw bar swingably suspended from said bracket between said walls, and means coacting with said side walls to retain said draw bar in various positions of adjustment about its suspension pivot.

8. In a trailer hitch, a bracket having opposite side walls and rigid arms extending outwardly therefrom, an independent supporting member slidably adjustable along each of said arms, a U-shaped clamp suspended from the outer end of each of said supporting members, a draw bar swingably suspended from said bracket between said side walls, and a coupling member secured to the swinging end of said draw bar.

9. In a trailer hitch, a bracket having opposite side walls and rigid arms extending outwardly therefrom, an independent supporting member slidably adjustable along each of said arms, a U-shaped clamp suspended from the outer end of each of said supporting members, a draw bar swingably suspended from said bracket between said side walls, a coupling member secured to the swinging end of said draw bar, and means coacting with said walls to clamp said draw bar so as to retain said coupling member in either active exposed or inactive concealed position.

10. In a trailer hitch, a bracket having rigid arms extending from the opposite sides thereof, a coupling member secured to said bracket between said arms, a supporting member horizontally slidably adjustable along each of said arms toward and away from said coupling member, and an attaching clamp for the hitch swingably adjustable about a vertical pivot relative to the outer end portion of each of said supporting members.

11. In a trailer hitch, a bracket having rigid arms extending from the opposite sides thereof, a coupling member swingably suspended from said bracket between said arms upon a horizontal transverse pivot, a supporting member horizontally slidably adjustable along each of said arms toward and away from said coupling member, and an attaching clamp for the hitch swingably adjustable about a vertical pivot relative to the outer end portion of each of said supporting members.

12. In a trailer hitch, a bracket having opposite side walls and channel shaped arms extending outwardly therefrom, a channel shaped supporting member slidably adjustable along each of said arms, a clamp suspended from the outer end of each of said supporting members, a draw bar swingably suspended from said bracket between said side walls, and a coupling member secured to the swinging end of said draw bar.

13. In a trailer hitch, a bracket having opposite side walls and channel shaped arms extending outwardly therefrom, a channel shaped supporting member slidably adjustable along each of said arms, a clamp suspended from the outer end of each of said supporting members, a draw bar pivotally suspended from said bracket between said side walls, a coupling member secured to the swinging end of said draw bar, and means coacting with said walls for clamping said draw bar in various positions relative to its suspension pivot.

HOWARD C. RIEMANN.
JOEL R. THORP.